Patented Jan. 31, 1939

2,145,242

UNITED STATES PATENT OFFICE 2,145,242

PROCESS OF MAKING ALIPHATIC POLYUREAS

Harold Wilfred Arnold, Wilmington, Del., assignor to E. I. du Pont de Nemours & Company, Wilmington, Del., a corporation of Delaware No Drawing. Application July 2, 1937, Serial No. 151,766

17 Claims. (Cl. 260—553)

This invention relates to amides and more particularly to ureas.

This invention has as its chief object the provision of a novel, convenient and economical process for the preparation of ureas. More specifically it relates to and has as an object the preparation of aliphatic polyureas, in particular aliphatic diureas of the comprehensive formula $H_2N-CO-NH-R-NH-CO-NH_2$, wherein R is a divalent aliphatic hydrocarbon radical containing a chain of at least two carbon atoms between the nitrogen atoms.

The above and other objects appearing hereinafter are accomplished by the following invention wherein urea is reacted, by heating, with an aliphatic polyamine having at least one hydrogen atom attached to each of two amino-nitrogen atoms, more particularly with a primary diamine in which the amino groups are separated by an aliphatic hydrocarbon radical having a chain of at least two carbons between the nitrogen, and still more particularly with a polymethylenediamine.

It is known from U. S. Patent 1,785,730 that urea combines with primary aliphatic monoamines to form s-dialkylurea without detectable amounts of monoalkylureas. However, insofar as is known, it has not been proposed to react urea with aliphatic polyamines of the above type. It has now been discovered that these compounds will combine readily, a variety of useful aliphatic polyureas being obtained.

The character of the aliphatic polyurea produced in the process of this invention depends on the type of amine employed. When amines having hydrogen attached to each of three or more amino nitrogens, especially those of the formula $NH_2[(CH_2)_xNH]_y(CH_2)_xNH_2$ wherein $x$ and $y$ are positive integers, are reacted with urea, for example at temperatures in the range of 120° C. to 160° C., there are obtained thermoplastic resinous polymers soluble in alcohols, ketones, and esters, insoluble in hydrocarbons, and limitedly soluble in water, the aqueous solutions being basic to litmus. Specific amines which have been found to undergo this type of condensation with urea are diethylenetriamine, triethylenetetramine, and bis-hexamethylenetriamine. The products are useful in coating compositions and as intermediates for further reaction with formaldehyde to form thermo-setting resins.

When the amine reacted with urea is an aliphatic primary diamine, especially one wherein the amine groups are separated by an aliphatic hydrocarbon radical such as a polymethylene radical, the products are quite different from those obtained with the types of amines just discussed. Instead of being resinous polymers, they are definite crystalline monomeric compounds of the formula $NH_2-CO-NH-R-NH-CO-NH_2$ in which R is the divalent aliphatic radical originally in the amine between the two amino groups. That this type of compound, instead of a resinous polymer or a symmetrical bis-monoalkylurea, should be formed is very surprising in view of the manner in which urea is known to combine with aliphatic monoamines. As already pointed out, the latter amines yield s-dialkyl ureas only, that is each molecule of urea reacts with two amine groups, whereas in that part of the present process involving primary diamines of the stated type each molecule of urea reacts with only one amine group. Expressed differently, it is surprising that definite crystalline monomeric compounds instead of resinous polymers are formed in this reaction between two bifunctional compounds, yet this phenomenon is true even when proportions are varied over wide ranges (compare Examples I and II below).

In carrying out the preferred embodiment of this invention, discussed above, the urea is heated with the aliphatic primary diamine to reaction temperature, the heating continued until no more ammonia is evolved, and the polyurea isolated by crystallization from a solvent wherein the polyurea is soluble at elevated temperature but relatively insoluble or only slightly soluble at ordinary temperatures. The net reaction may be represented by the following equation, wherein $x$ is a positive integer of at least 2:

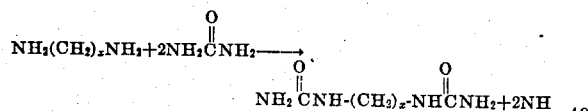

The more detailed practice of the invention is illustrated by the following examples, wherein parts given are by weight unless otherwise stated. There are of course many forms of the invention other than these specific embodiments.

Example I.—Hexamethylenediurea

An intimate mixture of 115 parts of hexamethylenediamine (1 mol) and 180 parts of crystalline urea (3 mols) was heated at 130–140° C. for a period of 3 to 4 hours. The mixture became completely liquid after thirty minutes of heating and the fusion was accompanied by a rapid evolution of ammonia which decreased in amount with continued heating. At the end of two hours the evolution of ammonia practically ceased, but, although solid, the mixture was subjected to an additional hour of heating to insure complete reaction. The solid product was then dissolved in hot water and on cooling 180 parts or a 90% yield of hexamethylenediurea of M. P. 196° C. was obtained.

Example II.—Hexamethylenediurea

Example I was repeated using 16 parts of hexamethylenediamine (1 mol) and 8.5 parts of crystalline urea (1 mol). Thirteen and two-tenths parts of hexamethylenediurea was obtained. This was a yield of 96.5 per cent of the theoretical amount based on the urea. When the temperature is raised to 160 to 180° C., however, these particular proportions will begin to show some evidence of polymer formation.

It is important to note from the foregoing two examples that the yield, with proper temperature control in Example II, is practically quantitative in the sense of the equation given above regardless of the relative proportion of the diamine and the urea. The diurea alone seems to be formed although in Example I the urea is present in 50% excess, and although in Example II the diamine is present in 100% excess of the amounts necessary for diurea formation.

Example III.—Ethylenediurea

A mixture of 75 parts of ethylenediamine and 233 parts of urea was intimately mixed and then heated under reflux at 130–140° C. for three hours. The mixture soon became liquid and a rapid evolution of ammonia took place. When the evolution of ammonia was practically complete, the mixture became solid. This solid product was crystallized from boiling water and 179 parts or a 99% yield of ethylenediurea of M. P. 193–4° C. was obtained.

Example IV.—Decamethylenediurea

A finely ground mixture of 47 parts of decamethylenediamine and 47 parts of urea was heated at 130–140° C. for four hours. The mixture did not become completely liquid but ammonia was evolved at a rapid rate. This evolution practically ceased at the completion of four hours of heating and the mixture became solid. The hard cake was then finely pulverized and the powder repeatedly extracted with boiling alcohol to remove soluble by-products. Seventy-five parts or a 95% yield of decamethylenediurea M. P. 182–186° C. was obtained.

The invention has been illustrated above with polymethylenediamines. For the particular polymethylenediamines of the examples there may be substituted any other polymethylenediamine, including tetramethylenediamine, pentamethylenediamine, octamethylenediamine, dodecamethylenediamine, pentadecamethylenediamine, octadecamethylenediamine, and still higher polymethylenediamines, and equally satisfactory results obtained. Any primary diamine in which the amine groups are separated by an aliphatic hydrocarbon radical having at least two carbons between the amino nitrogens may be used, including propylenediamine, butylenediamine, 1,4-cyclohexylenediamine, 1,2 - dimethylethylenediamine, 1,10-dimethyldecamethylenediamine, and 1,4-di(aminomethyl)-cyclohexane. Any aliphatic primary diamine having its amino groups separated by an aliphatic radical of at least two carbon atoms may be used. The invention contemplates diamines which term excludes amido compounds. Still other amines which may be used are $\beta,\beta'$-diaminodiethyl ether, $\gamma,\gamma'$-diaminodipropyl ether, $\beta,\beta'$-diaminodiethyl sulfide, $\gamma,\gamma'$-diaminodipropyl sulfide, and 1,2-di(aminomethyl)dioxane. These primary diamines yield crystalline diureas analogous to those of the examples. The polymethylenediamines do so with the greatest facility.

The temperature of reaction may be varied from about 100° to about 200° C., but the reaction generally proceeds most smoothly at about 120 to 160° C. Temperatures above the latter point sometimes cause some resinification and hence are less satisfactory. The higher the temperature employed, the faster the reaction proceeds, but usually the lower the yield due to the loss of urea through decomposition. The time of heating is somewhat dependent on the temperature of the reaction, but usually 3 or 4 hours of heating is necessary to complete the reaction as judged by the cessation of the evolution of ammonia.

The amounts of diamine and urea employed may be varied within wide limits without materially affecting the final outcome of the reaction, i. e., the formation of the diurea. However, it is advantageous to employ two mols of urea for one mol of diamine. Urea liquor can be used instead of crystalline urea but allowance must be made for the impurities. Instead of the free diamines, diamine salts such as the hydrochloride, acetate, carbonate, or lactate may be used. If desired a current of inert gas such as hydrogen, nitrogen, carbon monoxide or water gas may be passed through or over the reaction mixture, particularly during the latter stages of the process, to facilitate removal of ammonia. The process may also be carried out to advantage in the presence of inert liquid diluents, particularly phenols such as phenol, the cresols, and hydroxydiphenyl, which are solvents for the reactants but not for the product.

The reaction can be carried out with or without agitation. Catalysts such as aluminum chloride, stannic chloride, ferric chloride, boron trifluoride, etc., may be employed if so desired.

The crystalline monomeric aliphatic diureas described herein are also useful as intermediates for resins of the ureaformaldehyde type. One process for making such resins consists in carrying out a preliminary condensation between, for example, hexamethylenediurea and formaldehyde in the presence of an excess of a monohydric alcohol, such as isobutyl alcohol, at a pH of 8–9 and a temperature of 90° to 100° C., followed by a final condensation in an acid medium, at reflux temperature. The final condensation is performed in such a manner that the water formed during the condensation can be removed from the sphere of action, thus causing the reaction to go to completion, and showing that the alcohol takes part in the condensation and is an essential ingredient of the resin. The heat-hardening resins, thus obtained in an alcohol soluble form, set to a tough glossy film with exceptional water and alkali resistance. Films cast from a 50% isobutanol solution air dry and become tack-free in two hours at room temperature or in 5 minutes at 100° C.

In Examples I, II and III, the polyurea is isolated by crystallization from water. In Example IV, the polyurea is isolated by dissolving out the impurities. The invention is not limited to these methods of purification. The product may be extracted with dilute hydrochloric or sulfuric acids, and subsequently precipitated with alkali, or it may be crystallized from an organic solvent, such as an alcohol, a ketone, an ester, an aromatic hydrocarbon, or an aliphatic hydrocarbon.

In the specification and claims the term "aliphatic" includes "cycloaliphatic" as well as "open chain aliphatic". The term "aliphatic primary diamine" in the claims represents a compound containing two amino ($NH_2$) groups separated by an aliphatic radical. Similarly the term "aliphatic primary polyamine" represents a compound containing a plurality of amino ($NH_2$) groups attached to an aliphatic radical.

The process described herein is a simple, direct method for obtaining aliphatic diureas applicable readily on a commercial scale. It is a comparatively inexpensive process.

The above description and examples are intended to be illustrative only. Any modification of or variation therefrom which conforms to the spirit of the invention is intended to be included within the scope of the claims.

I claim:

1. Process of preparing aliphatic polyureas which comprises heating urea with a member of the class consisting of aliphatic polyamines having at least one hydrogen atom on each amino nitrogen atom and acid addition salts thereof at a temperature sufficient to cause the evolution of ammonia but below that at which decomposition takes place, and thereafter isolating the polyurea.

2. Process of preparing aliphatic polyureas which comprises heating an aliphatic polyamine having at least one hydrogen atom on each amino nitrogen atom and urea at a temperature sufficient to cause the evolution of ammonia but below that at which decomposition takes place, continuing the heating until no further ammonia is evolved, and thereafter isolating the polyurea.

3. Process of preparing aliphatic diureas which comprises heating urea with an aliphatic primary diamine at a temperature sufficient to cause the evolution of ammonia but below that at which decomposition takes place until ammonia ceases to be evolved and thereafter isolating the diurea.

4. Process of preparing polymethylenediureas which comprises heating urea with a polymethylenediamine having at least one hydrogen atom on each amino nitrogen atom at a temperature sufficient to cause the evolution of ammonia but below that at which decomposition takes place until ammonia ceases to be evolved and thereafter isolating the polymethylenediurea.

5. Process of preparing polymethylenediureas which comprises reacting urea with a polymethylenediamine having at least one hydrogen atom attached to each amino-nitrogen atom, in a molar ratio of about two to one, at 120 to 160° C. until evolution of ammonia substantially ceases.

6. Process of preparing aliphatic polyureas which comprises heating an aliphatic primary polyamine and urea at a temperature sufficient to cause the evolution of ammonia but below that at which decomposition takes place, continuing the heating until no further ammonia is evolved, and thereafter isolating the polyurea.

7. Process of preparing polymethylenediureas which comprises heating urea at a temperature sufficient to cause the evolution of ammonia but below that at which decomposition takes place with a primary polymethylenediamine until ammonia ceases to be evolved and thereafter isolating the polymethylenediurea.

8. Process of preparing polymethylenediureas which comprises reacting urea with a primary polymethylenediamine in a molar ratio of about two to one, at 120–160° C., until evolution of ammonia substantially ceases.

9. Process of preparing aliphatic polyureas which comprises heating urea with a member of the class consisting of aliphatic primary polyamines and addition salts thereof, at a temperature sufficient to cause the evolution of ammonia but below that at which decomposition takes place, and thereafter isolating the polyurea.

10. Process of preparing aliphatic polyureas which comprises heating urea with an aliphatic primary polyamine at a temperature sufficient to cause the evolution of ammonia but below that at which decomposition takes place until ammonia ceases to be evolved and thereafter isolating the polyurea.

11. Process of preparing aliphatic polyureas which comprises heating urea with an aliphatic primary diamine at a temperature sufficient to cause the evolution of ammonia but below that at which decomposition takes place until ammonia ceases to be evolved and thereafter isolating the polyurea.

12. Process of preparing polymethylenediureas which comprises heating urea with an aliphatic primary polymethylenediamine at a temperature sufficient to cause the evolution of ammonia but below that at which decomposition takes place until ammonia ceases to be evolved and thereafter isolating the polyurea.

13. Process of preparing aliphatic polyureas which comprises heating, at 100–200° C., urea with a member of the class consisting of aliphatic primary polyamines and addition salts thereof and thereafter isolating the polyurea.

14. Process of preparing aliphatic polyureas which comprises heating, at 100–200° C., urea with an aliphatic primary polyamine until ammonia ceases to be evolved and thereafter isolating the polyurea.

15. Process of preparing aliphatic polyureas which comprises heating, at 100–200° C., urea with an aliphatic primary diamine until ammonia ceases to be evolved and thereafter isolating the polyurea.

16. Process of preparing polymethylenediureas which comprises heating, at 100–200° C., urea with an aliphatic primary polymethylenediamine until ammonia ceases to be evolved and thereafter isolating the polyurea.

17. Process of preparing aliphatic diureas which comprises heating urea at 100–200° C. with an aliphatic diprimary diamine until ammonia ceases to be evolved and thereafter isolating the diurea.

HAROLD WILFRED ARNOLD.